United States Patent [19]

Bessho et al.

[11] Patent Number: 4,669,865
[45] Date of Patent: Jun. 2, 1987

[54] COOLING DEVICE FOR A LIGHT SOURCE IN A COPYING MACHINE

[75] Inventors: Yoshihiko Bessho; Koji Yamashita; Masanori Katayama, all of Shiga, Japan

[73] Assignee: Dainippon Screen Mfg. Co., Ltd., Kyoto, Japan

[21] Appl. No.: 861,257

[22] Filed: May 9, 1986

[30] Foreign Application Priority Data

May 17, 1985 [JP] Japan .................. 60-106494

[51] Int. Cl.$^4$ ............................................. G03B 27/52
[52] U.S. Cl. .................................... 355/30; 352/202; 353/61; 355/71
[58] Field of Search ................. 313/11, 22, 24; 362/294, 6; 355/30, 67, 71; 352/202; 353/55, 61

[56] References Cited

U.S. PATENT DOCUMENTS

| | | | |
|---|---|---|---|
| 3,187,173 | 6/1965 | Foley et al. | 362/294 |
| 3,523,724 | 8/1970 | Lancor, Jr. | 352/202 |
| 3,626,176 | 12/1971 | Tsugami | 362/294 |
| 3,762,814 | 10/1973 | Kitch | 355/30 |
| 3,831,021 | 8/1974 | Muhlogger | 362/294 |
| 3,923,394 | 12/1975 | Frankiewicz | 355/30 X |
| 3,986,018 | 10/1976 | Ishii | 355/67 X |
| 4,095,881 | 6/1978 | Maddox | 355/30 |

FOREIGN PATENT DOCUMENTS 59136322 10/1979 Japan .
59-149340 8/1984 Japan .

Primary Examiner—Richard A. Wintercorn
Attorney, Agent, or Firm—Lowe, Price, LeBlanc, Becker & Shur

[57] ABSTRACT

A cooling device is provided for a light source in a copying machine, wherein the generation of air seemingly waving due to heat is prevented by effectively cooling a lamp body for lighting an original effectively in order to obviate the deterioration of an optical image.

Light pervious heat-shield members are disposed at suitable intervals in an irradiation opening of the lamp body accommodating light source bulb and a reflector therewithin so as to enable blowing of ambient air past and between these members. At least the member positioned at the side of the light source bulb is composed of a heat-ray absorption glass. Air flow is guided through the chamber accommodating the light source bulb so that it may perform a forced air cooling of the inside of the lamp body in order to prevent the generation of the air waving due to heat from the lamp.

3 Claims, 3 Drawing Figures

COOLING DEVICE FOR A LIGHT SOURCE IN A COPYING MACHINE

BACKGROUND OF THE INVENTION

Field of the Invention

The present invention relates to a cooling device for a light source in a copying machine, and in particular to a cooling technology for a lighting device composed of a light source bulb and a reflector accommodated within a lamp body.

Generally, a high grade bright lamp such as a halogen lamp is utilized for lighting an original in a copying machine. However, such a bright lamp also radiates much heat, and elements near the lamp are apt to suffer from the resultant high temperature.

A known cooling device for a light source in a copying machine, as disclosed in Japanese Provisional Patent Publication No. 136322 of 1979, for example is so constructed that a duct-like lamp body which accommodates a long curved reflector and a light source bulb therein is provided with an irradiation opening and a filter that is pervious to light but blocking infrared rays. The air heated by the light source is removed by blowing air into the body so as to also cool the light source bulb.

However, since the filter that is a light-pervious heat-shield member is cooled only at the inside and the heat accumulated in it is radiated from its outer surface, elements near the filter can not be prevented from being heated thereby.

The heated air around the filter is therefore apt to appear waving with the heat radiated from the filter. When the seemingly waving air is extends into the light path focusing an image, in the optical system of the copying machine, the copied image is likely to be reproduced out of focus owing to the image focus being deteriorated by the "waving" heated air.

DISCLOSURE OF THE INVENTION

The present invention is directed to solving the problems noted above, and has for its object to provide a cooling device for a light source in a copying machine, which is able to prevent the presence of heated air waving around the filter.

In a preferred embodiment of the cooling device of the present invention for accomplishing the above purpose, light-pervious heat-shield members are disposed at suitable intervals in an irradiation opening of a lamp body accommodating a light source bulb and a reflector therewithin, so as allow blowing of ambient air past these members. At least the members positioned at the side of the light source bulb are composed of a heat-ray absorption glass. Accordingly, the cooling device discharges ambient air blown past these members of the lamp body through the chamber accommodating the light source bulb, so that this blown air may perform a forced cooling of the inside of the lamp body to prevent the generation of the air waving with heat.

According to the present invention, since those light-pervious heat-shield members are disposed at suitable intervals in the irradiation opening of the lamp body so as to enable blowing of ambient air for cooling into among these members and provide air layers between each pair of them, the heat transfer to outside members is prevented by these air layers and each pair of members is cooled effectively by the cooling air flow passing therethrough. Since the light-pervious heat-shield member at the light source side is composed of a heat-ray absorption glass, heat rays radiated linearly from the light source bulb and the reflector are absorbed and accumulated by the glass and heat is then radiated from the glass. This heat is removed by the cooling air flow passing through the space outside and thus the heat transfer to the outside members is blocked effectively. Further, since the cooling air flow passed through the spaces among the members is discharged through the chamber (which contains the light source bulb within the lamp body), the chamber is also cooled effectively. Hence other optical elements that should not be subjected to the heat radiation from the the lamp body are also kept cool.

The foregoing and other objects and attendant advantages of the present invention will be readily appreciated as the same become better understood by reference to the following detailed description when considered with the accompanying drawings, wherein:

DESCRIPTION OF THE PREFERED EMBODIMENT

Figure 2:
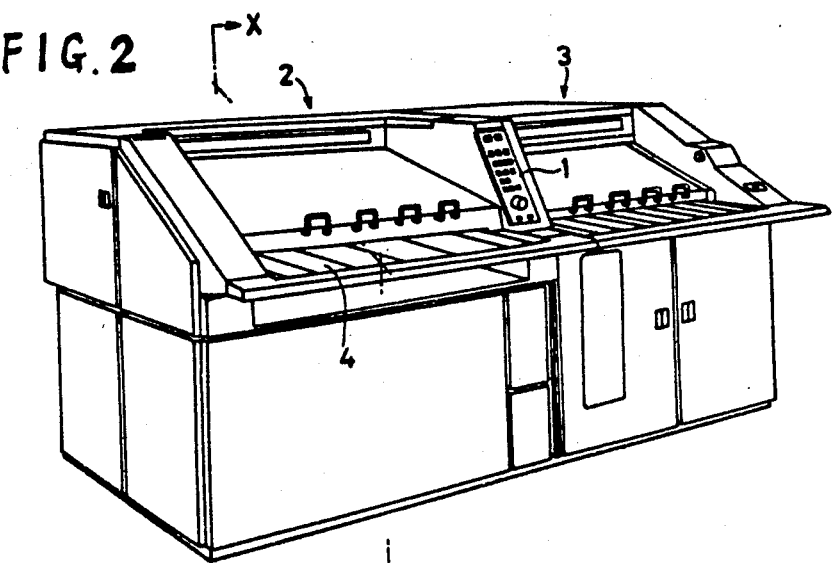
FIG. 2 is a perspective view of an electrophotographic copying machine according to the present invention.
Figure 3:
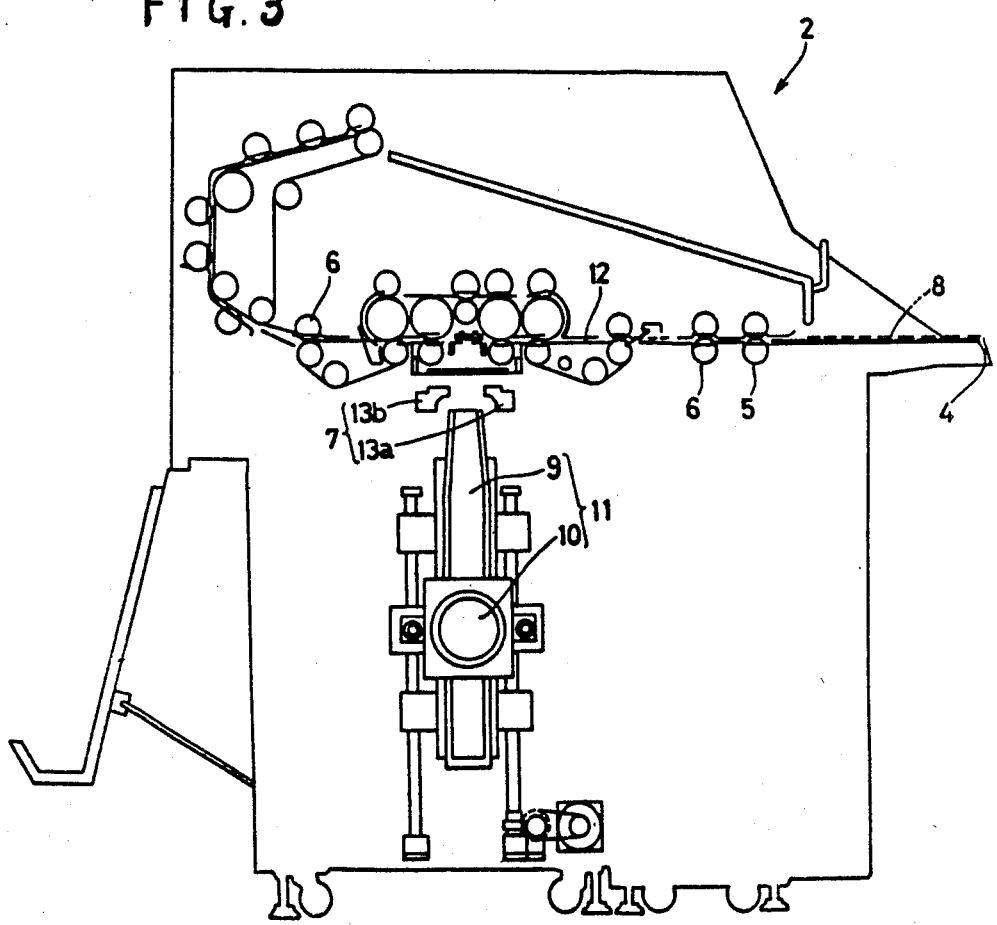
FIG. 3 is a schematic sectional view on line X—X in FIG. 2.

As shown in FIGS. 2 and 3, a typical electrophotographic copying machine comprises an operation panel 1 at the center of its front side, original feeding and scanning equipment 2 at its left side and reproduced image recording equipment 3 at its right side. In the original feeding and scanning equipment 2, when an original with an image facing onto an original setter 4 is fed into the equipment it is carried by feed rollers 5 and carriage rollers 6 while being lighted by an original lighting device 7 on its way to an original receptacle.

While the original is being carried on this pathway, the image of the original is exposed in focus through a slit onto a photosensitive drum (not shown in Figures) by a focussing optical system 11 composed of a pair of mirrors 9 and a lens 10 so as to produce a latent image thereon. Then the latent image is made visible by means of a toner development device (not shown) and is transferred onto a sheet of recording paper as a toner image in the recording equipment 3.

The original lighting device 7 includes a pair of lamp bodies 13a and 13b, arranged in the front and in the rear at a right angle to an original carrying direction under an original carrying pathway 12 formed by the feed rollers 5 and the carriage rollers 6. Both lamp bodies 13a and 13b are thus disposed in the front and in the rear, respectively, across the optical axis of the focusing optical system centered therebetween, so that their irradiations are directed to cross the original carrying pathway 12 in its plane and towards an elongate rectangular region crossing at right angles to the optical axis.

Figure 1:
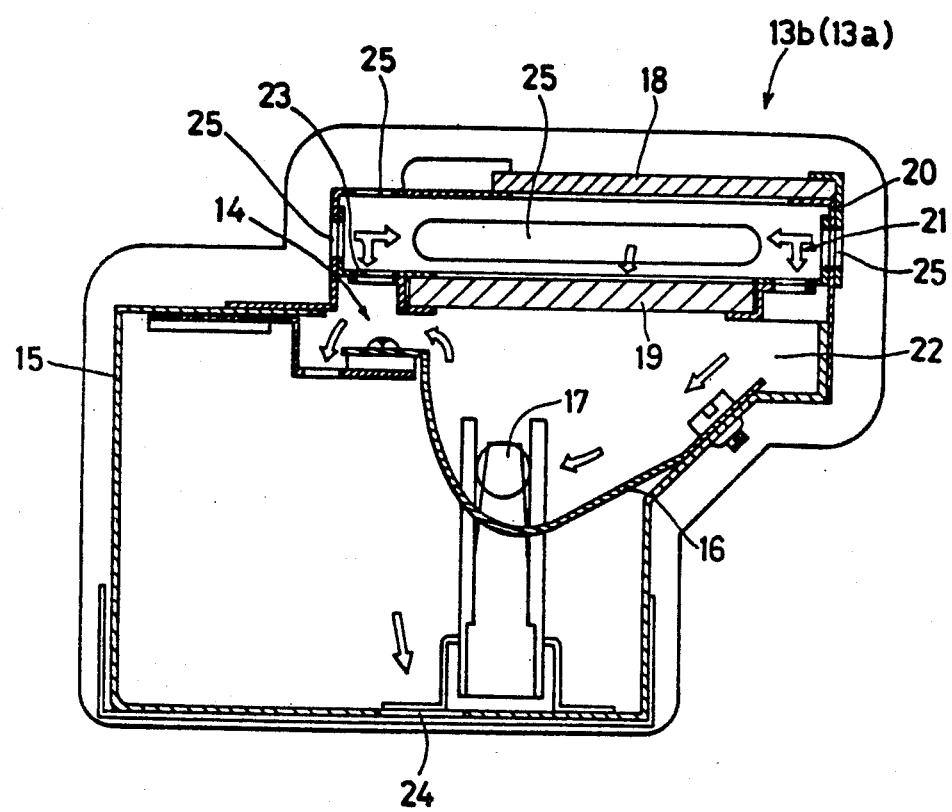
FIG. 1 is a vertical sectional view of a lamp body of a prefered embodiment of the present invention.

As each of the lamp bodies has the same construction, only the construction of the rear lamp body 13b is explained hereinafter, with reference to FIG. 1.

The lamp body 13b comprises a duct-like casing 15 provided with an irradiation opening 14 at the upper wall, a long curved reflector 16 fixed in the casing 15 and a plurality of straight tubular halogen lamps 17 as a light source arranged in series longitudinally at the inside of the curved reflector 16.

In the irradiation opening 14 of the casing 15, there is provided a supporting framework 20 for a heat-shield member which supports a heat resistance glass 18 and a heat-ray absorption glass 19, respectively above and below at suitable intervals. A space for a cooling air flow passage 21 is formed by the surrounding walls of the supporting framework 20 and both glass elements 18 and 19 positioned above and below, respectively. The cooling air flow passage 21 communicates with a chamber 22 accommodating the light source bulb through many communication holes 23. The chamber 22 communicates with the outside of the casing 15 through cooling air outlets 24 provided in the casing 15, and the passage 21 also communicates with the outside through cooling air inlets 25. The longitudinal side walls of the lamp body 13b are provided with many cooling air inlets 25 in zigzags, and the transverse side walls are provided with the inlets 25 of elongated holes as shown in FIG. 1. These cooling air inlets 25 are so communicated with a delivery portion of a blower (not shown) that ambient air for cooling may be supplied forcedly into the lamp body 13b, so as to cool not only the heat resistance glass 18 and the heat absorption glass 19 but also the chamber 22 accommodating the light source bulb and the bulb itself.

Further, the cooling air outlets 24 may be connected to a suction side of an induced draft fan (not shown) so as to make the inside of the lamp body forcedly air-cooled. Also, a heat-ray absorption glass may be utilized instead of the heat resistance glass in the irradiation opening. Still further, two plates of glass may be arranged so as to form dual cooling air flow passage.

As described above, since a cooling device according to the present invention is provided with light-pervious heat-shield members at suitable intervals in an opening of a lamp body accommodating a reflector and a light source bulb, at least the member at the bulb side of which is composed of a heat-ray absorption glass, so as to pass ambient air for cooling through the members, the heat rays radiated from the light source bulb can be absorbed by the heat-ray absorption glass to prevent the heat rays from being radiated to the outside of the lamp body. Further, since the light-pervious heat-shield members are arranged in multiplex state to cool them by ambient air supplied therebetween, the heat transfer to the outer members is blocked in order to lessen substantially the heat rays radiated from the outer members. Consequently, since the air-waving is thus eliminated near the lamp body, especially near the upper surface of the upper glass member, a reproduced image can be sharpened and made distinct.

On the other hand, when the cooling air supplied to flow among the multiplex light-pervious heat-shield members is discharged to the outside of the lamp body through the chamber accommodating the light source bulb, the durability of the light source bulb can be improved substantially by the forced air cooling for the bulb.

We claim:

1. A cooling device for a light source in a copying machine, which comprises:

a lamp body accommodating a reflector and a light source bulb therewithin, said lamp body being formed with plural cooling air inlets, outlets and communication holes;

an irradiation opening provided at the part of said lamp body opposite to said reflector; and a plurality of light-pervious heat-shield members arranged at suitable intervals in said irradiation opening, with at least the light-pervious heat-shield members positioned at the side of said light source bulb among said members being composed of a heat-ray absorption glass;

whereby space formed between each pair of said members communicates with the outside of said lamp body through said cooling air inlets, said space being communicated with a chamber accommodating said light source bulb through said communication holes and said chamber accommodating said bulb being communicated with said outside of said lamp body through said cooling air outlets to enable the flow of cooling air supplied from said outside of said lamp body to be passed in turn through said space between said members and through said chamber and then to be discharged to said outside, for forced air cooling of the inside of said lamp body.

2. A cooling device for a light source according to claim 1, further comprising:

a blower to provide said cooling flow.

3. A cooling device for a light source according to claim 1, further comprising:

a fan for applying suction to generate said cooling air flow.

* * * * *